United States Patent Office 3,526,616
Patented Sept. 1, 1970

3,526,616
POLYMERIZATION OF OLEFINS IN THE PRESENCE OF A CATALYST COMPRISING AN ORGANOMETALLIC COMPOUND, THE REACTION PRODUCT OF A TRANSITION METAL COMPOUND AND A HYDROXYCHLORIDE OF A BIVALENT METAL AND AN ALKOXIDE OF A METAL OF GROUP II–B
André Delbouille, Brussels, and Henri Toussaint, Schaerbeek, Belgium, assignors to Solvay & Cie, Brussels, Belgium, a corporation of Belgium
No Drawing. Filed Nov. 2, 1966, Ser. No. 591,402
Claims priority, application France, Nov. 4, 1965, 37,254
Int. Cl. C08f 1/56, 3/06
U.S. Cl. 260—94.9        13 Claims

ABSTRACT OF THE DISCLOSURE

Olefins are polymerized in the presence of a catalyst system including an alkylaluminum, a transition metal compound reacted onto a support which is a bivalent metal hydroxychloride, and an alkoxide of a transition metal of Group IV–B of the periodic table. A wide range of polyolefins may be produced, including slightly branched polyolefins. The invention is particularly applicable to ethylene. Especially notable among polymers produced according to the invention are slightly branched ethylene homopolymers.

---

The present invention relates to a process for polymerizing olefins to obtain polymers having new properties. The invention particularly relates to such a polymerization of ethylene. The invention further relates to the polymers resulting from the process and to a catalyst system employed in the process.

In French Pat. No. 1,375,127 and Addition No. 85,522 thereto (together corresponding to U.S. application Ser. No. 377,476, filed June 24, 1964 now U.S. Pat 3,400,110 and having the same assignee as the present application) a process is described for the polymerization and the copolymerization of olefins in the presence of a catalyst. The catalyst or catalyst system comprises a first component which is activated by a second component. The first component is an alkylaluminum and the second component is the product resulting from the reaction between a compound of a transition metal and a solid hydroxychloride of a bivalent metal, the hydroxychloride serving as a base or suport for transition metal compound.

Applied to the polymerization of ethylene, the process o fthe aforementioned patent provides polyethylenes having a very high linearity, a particularly high specific gravity and a very low unsaturation. These products are particularly suitable for applications involving injection molding. However, the polyethylenes of this type are rather less suitable for other applications and, more particularly, for those in which a high resistance to cracking under stress ("stress-cracking") is required. It is known that for such applications polyethylenes having a proportion of molecules which have a relatively small number of side or lateral chains and, more especially, of side or lateral chains containing at least two atoms of carbon, are superior to the extremely linear polyethylenes. The polyethylenes having a small number of such side or lateral chains may conveniently be referred to as being "slightly branched."

The production of slightly branched polyethylenes by means of catalysts which normally result in products which are quite linear by adding to the ethylene which is to be polymerized a certain quantity of another olefin, butene-1 for example, is well known. However, the presence of this comonomer greatly complicates the polymerization and increases the cost of the resins (polymers).

It is therefore, an object of this invention to produce slightly branched polyethylenes by the use of special catalysts and without the employment of a co-monomer, Other objects of the invention will become apparent from the following detailed description. According to the present invention, it is found that the polymerization of ethylene in the presence of an alkylaluminum, of an alkoxide of an element of Group IV–B and of the product of the reaction between a compound of a transition metal and a solid hydroxychloride of a bivalent metal makes it possible to obtain ethylene homopolymers having a wide range of specific gravities extending from about 0.895 to 0.970, improved flexibility and pliability and very high "stress-cracking" resistances.

The process of the invention consists in effecting the polymerization of olefins, and, more particularly, ethylene, by contacting the olefin with a catalyst system comprising an alkylaluminum, an alkoxide of a metal of Group IV–B of the Periodic Table and the product of the reaction between a compound of a transition metal and a solid base consisting of a hydroxychloride of a bivalent metal.

The result obtained is particularly surprising or unexpected in view of the fact that it is known to add alkoxides of titanium to catalysts constituting a compound of a transion metal and an alkylaluminum and that it has been found in this case that there is an increase in the stereoregularity and the crystallinity of the products obtained (Belgian Pat. No. 633,529 and Dutch patent application No. 233,470).

According to the present invention, in contrast to the foregoing, it is observed that the presence of an alkoxide of titanium or of another element of Group IV–B results in the formation of products which are less regular and less crystalline. This difference in behavior is very likely linked to the presence in the catalyst system of the reaction product of a compound of a transition metal and a solid hydroxychloride of a bivalent metal, which apparently has a great influence on the properties of the catalyst. It is, however, not intended that this theory limit the scope of the invention.

The solid hydroxychlorides of bivalent metals herein employed correspond to the formula $M(OH)Cl$ wherein M is the bivalent metal. Such hydroxychlorides possessing a lamellar structure due to the compact stacking or piling up of the anions are preferably employed. The hydroxychlorides of magnesium, of calcium, of cadmium, of zinc and of iron are so characterized. The hydroxychloride of magnesium is the most preferred hydroxychloride employed in the present invention.

The reaction between the compound of a transition metal which is reacted with the hydroxychloride and the hydroxychloride is effected by means of the OH groups of the hydroxychloride. If M' represents a transition metal and X a monovalent reactive group in a compound with M', the reaction can be represented in the following manner:

$$X_nM' \text{ plus } M(OH)Cl \rightarrow X_{n-1}M'-O-MCl \text{ plus } XH$$

The transition metal compounds to be reacted with the hydroxychlorides are to have a good reactivity with respect to the hydroxyl groups of the hydroxychlorides. More particularly halogens, halogeno-alkoxides and the alkoxides of the metals of Groups IV–B, V–B and VI–B of the Periodic Table can be utilized, and preferred are those compounds of titanium and of vanadium: for example, $TiCl_4$, $Ti(OC_2H_5)_4$, $Ti(OC_2H_5)_3Cl$, $VOCl_3$, $VCl_4$. The hydroxychloride, in effect, serves as a solid base to which the transition metal compound is chemically bonded.

The alkylaluminums are utilized in the catalyst system for the purpose of activation and are preferably the trialkylaluminums; to use triethylaluminum or tri-isobutyl-aluminum is particlarly convenient.

The alkoxides of the metals of Group IV–B of the Periodic Table which are employed in the catalyst system of the present invention are preferably the alkoxides of titanium or of zirconium derived from lower alcohols, particularly alcohols having 1 to 4 carbon atoms. Titanium tetraisopropylate, titanium tetrabutylate and zirconium tetrabutylate are more particularly preferred.

The preparation of the actalyst system can be carried out in the presence of ethylene to be polymerized. This method of operation can, in certain cases, bring about an increase in the activity of the catalyst system.

The polymerization can be carried out according to the known techniques, notably in the presence of a dispersing medium in which the monomer is soluble and in which the polymer formed is dispersed, or in a gas or vapor phase.

It has been verified that the properties of the polyethylenes obtained, and in particular their true specific gravities, depend upon the quantity of the alkoxide in the catalyst system and, more particularly, upon the molecular ratio of the alkoxide to reaction product of the compound of a transition metal and the hydroxychloride. The greater this ratio, i.e., the greater the quantity of the alkoxide employed in the catalyst system, the lesser are the linearity and the true specific gravity of the polyethylene obtained. The smaller this ratio, i.e., the smaller the quantity of the alkoxide employed in the catalyst system, the greater are the linearity and the true specific gravity of the polyethylene.

The molecular ratio of the alkoxide of an element of Group IV–B with respect to the transition metal compound present in the product of the reaction between a compound of a transition metal and hydroxychloride is between 50 and 0.05. A ratio greater than 10 result in polyethylenes which are quite branched, having a true specific gravity no greater than about 0.920. The specific gravity increases and can be greater than 0.960 when this ratio is decreased. Practically, at ratios of 0.05 and below, the effect of the alkoxide become imperceptible.

On the other hand, the relative proportions of the alkylaluminum and of the product of the reaction between a compound of a transition metal and the hydroxychloride have only slight influence on the properties of the products obtained and on the activity of the catalyst system, as long as the alkylaluminum is present in excess of that quantity which reacts with the product of the reaction between a compound of transition metal and the hydroxychloride.

Polymers are obtained according to this invention having a wide range of properties and this range may be further broadened by varying the molecular weight of the polymers. For example, it is possible to reduce the molecular weight by conducting the polymerization in the presence of hydrogen.

According to the invention, it is possible to obtain ethylene homopolymers having a specific gravity as low as about 0.895 to 0.920 and characterized by reduced crystallinity and a great deal of flexibility.

Ethylene homopolymers produced according to the invention having a higher specific gravity of about 0.940 to 0.970, are more rigid and are particularly resistant to stress-cracking even when in contact with certain chemical products such as detergents which are known to induce or accelerate stress-cracking. These overall properties result in resins which are particularly well adapted to the production of containers of all kinds, especially containers produced by blow molding.

The following examples illustrate the invention without limiting the scope of the invention:

EXAMPLES 1 TO 7

Into a 3 l. autoclave, made of stainless steel, which has been dried and blown with dry nitrogen, there is introduced 0.5 g. of $Al(C_2H_5)_3$, in the form of a solution thereof in hexane, the solution having a concentration of 200 g./l., and then 1 l. of technical grade hexane which has been purified by passage over $AlCl_3$ followed by distillation and drying on activated alumina.

The mixture is brought to a temperature of 80° C. with constant stirring and pure and dry ethylene is then introduced under a pressure of 10 kg./cm.$^2$. As soon as the equilibrium of the dissolution of the ethylene in the hexane is reached, hydrogen is introduced in such quantity as to result in the partial pressure indicated in Table I hereinafter.

Then the quantity of titanium isopropylate indicated in Table I is introduced in the form of a solution in hexane, by means of a pressure gauge.

Shortly thereafter, the product of the reaction of magnesium hydroxychloride and titanium tetrachloride is injected into the autoclave. This product is prepared by suspending 5 g. of $Mg(OH)Cl$ in 25 ml. of $TiCl_4$ and heating the suspension at 130° C. with stirring for a period of 1 hour. After cooling, the resulting solid reaction product is decanted and it is washed with hexane until all traces of $TiCl_4$, not fixed chemically to the solid, are eliminated. The washed reaction product contains 4.4 g. of titanium per kg. of the reaction product.

The polymerization is effected at constant pressure over a period of two hours, the ethylene consumed being constantly replaced by fresh ethylene. After that period of two hours, the autoclave is cooled. The gases remaining are removed and the polyethylene is separated from the solvent by filtration.

The operating conditions and results of Examples 1 to 7 are set forth in Table I:

TABLE I

| No. of the Example | 1 | 2 | 3 | 4 | 5 | 6 | 7 |
|---|---|---|---|---|---|---|---|
| Quantity of the reaction product of $Mg(OH)Cl$ with $TiCl_4$, mg | 281 | 300 | 290 | 296 | 290 | 308 | [2] 252 |
| Quantity of $Ti(i-C_3H_7O)_4$ introduced, mg | 125 | 125 | 125 | 62.5 | 31.25 | 31.25 | 20 |
| Molar ratio of $Ti(OR)_4$ to Ti fixed on $Mg(OH)Cl$ | 17 | 16 | 16.5 | 8 | 4 | 4 | 2.5 |
| Partial pressure of hydrogen, kg./cm.$^2$ | 0 | 1 | 5 | 1 | 1 | 5 | 2 |
| Weight of polyethylene obtained, g | 210 | 59 | 52 | 112 | 296 | 194 | [3] 513 |
| Specific activity [4] | 8,500 | 2,240 | 2,040 | 4,310 | 11,600 | 7,160 | 6,250 |
| Melt Index of the polyethylene, [1] g./10 min | 0.002 | 0.02 | 2 | 0.07 | 0.03 | 3.6 | 0.06 |
| True specific weight of the polyethylene (or, if expressed without dimensions, true specific gravity), kg./dm.$^3$ | 0.914 | 0.917 | 0.924 | 0.916 | 0.928 | 0.946 | 0.931 |

See footnotes at end of Table III.

It has been verified that the process of this invention makes it possible to produce a wide range of polyethylenes of a given actual specific gravity and melt index simply by varying the quantities of titanium alkoxide and of hydrogen employed.

The irregularities in the actual specific gravity which can be observed in Table I are due to the influence of the melt index on the actual specific weight.

EXAMPLES 8 TO 14

Operation is carried out exactly according to the method of operation of Example 1, but, with respect to the reaction products of $Mg(OH)Cl$ with $TiCl_4$, after the heating at 130° C., the solid substance is transferred to the basket of an extractor of the Kumagawa type and is extracted for a period of 1 hour by means of boiling TiCl$_4$.

The operating conditions of these examples and the results obtained are indicated in Table II shown hereinafter:

Table III further illustrates production acording to the invention of polyethylenes of any desired specific gravity, even products very close to but slightly different from conventional highly linear polyethylenes. These last men-

TABLE II

| No. of Example | 8 | 9 | 10 | 11 | 12 | 13 | 14 |
|---|---|---|---|---|---|---|---|
| Reaction product of Mg(OH)Cl with TiCl$_4$: | | | | | | | |
| Ti content, g./kg | 3.7 | 3.7 | 3.7 | 3.7 | 5.8 | 5.8 | 5.8 |
| Quantity employed, mg | 541 | 376 | 376 | 333 | 172 | 172 | 172 |
| Titanium alkoxide: | | | | | | | |
| Type | Ti(OiPr)$_4$ | Ti(OiPr)$_4$ | Ti(OiPr)$_4$ | Ti(OiPr)$_4$ | Ti(OBu)$_4$ | Ti(OBu)$_4$ | Ti(OBu)$_4$ |
| Quantity employed, mg | 15 | 15 | 15 | 5 | 5 | 6 | 6 |
| Alkylaluminum: | | | | | | | |
| Type | Al(Et)$_3$ | Al(Et)$_3$ | Al(Et)$_3$ | Al(Et)$_3$ | Al(iBu)$_3$ | Al(Et)$_3$ | Al(iBu)$_3$ |
| Quantity employed, mg | 500 | 500 | 500 | 500 | 868 | 500 | 868 |
| Molar ratio of Ti(OR)$_4$ to Ti fixed on Mg(OH)Cl | 1.3 | 1.8 | 1.8 | 0.7 | 0.8 | .08 | 0.8 |
| Partial pressure of the hydrogen, kg./cm.$^2$ | 2.5 | 2.5 | 1.9 | 2 | 5 | 5 | 5 |
| Weight of the polyethylene obtained, g | 477 | 331 | 344 | 6 204 | 270 | 239 | 116 |
| Specific activity of the catalyst [4] | 12,100 | 12,000 | 12,590 | 16,600 | 13,400 | 11,800 | 5,750 |
| Intrinsic viscosity, l./g | 0.21 | 0.24 | 9.23 | 0.25 | 0.23 | 0.22 | 0.20 |
| Melt index, g./10 min | 0.80 | 0.77 | 0.08 | 0.16 | 0.23 | 0.34 | 0.46 |
| Melt viscosity at 190° C. under 100 sec.[1], poises | 10,300 | 12,800 | 20,000 | 22,500 | 20,500 | 22,600 | 15,000 |
| Actual specific weight, kg./cm.$^3$ | 0.944 | 0.944 | 0.940 | 0.950 | 0.955 | 0.955 | 0.948 |
| Resistance to stress-cracking,[5] h | 95 | 160 | 800 | 267 | 148 | 148 | 222 |
| Modulus of rigidity in torsion at 23° C., kg./cm.$^2$ | 2,800 | 2,700 | 2,300 | 2,800 | 2,800 | 3,200 | 2,500 |
| Tensile strength (yield-stress), kg./cm.$^2$ | 250 | 230 | 220 | 270 | 275 | 290 | 245 |

See footnotes at end of Table III.

Table II, on the one hand, illustrates the facility and the precision with which it is possible to obtain polyethylenes having a selected specific weight by regulating the proportions of the reactants employed and, on the other hand, the excellent properties of the products obtained. Particularly notable among the latter are excellent flexibility and resistance to stress-cracking under particularly high tension.

EXAMPLES 15 TO 18

These examples are carried out under conditions which are identical to those of Examples 8 to 14. Examples R$_1$ to R$_4$ are given as a matter of reference. Example R$_1$ demonstrates the properties of a linear polyethylene prepared by means of a catalyst system consisting of triethylaluminum and the product of the reaction of

Mg(OH)Cl with TiCl$_4$. In Example R$_2$, the catalyst system consists of TiCl$_4$ not fixed on Mg(OH)Cl whereas Examples R$_3$ and R$_4$ demonstrate the effects of the addition of alkoxides of titanium to a catalyst system of Example R$_2$ type.

The operating conditions and the results of Examples 15 to 18 and R$_1$ to R$_4$ accompanied by the data concerning the properties of the products obtained are set forth in Table III.

tioned polyethylenes obtained according to the present invention have a very greatly improved resistance to cracking under tension and have a much greater flexibility compared with the conventional highly linear polyethylenes.

Example R$_2$, R$_3$ and R$_4$ moreover demonstrate that the effects of the addition of a titanium alkoxide to a polymerization catalyst system in which the transition metal compound, such as titanium tetrachloride, is not reacted onto Mg(OH)Cl are totally different from those observed for the catalyst systems of this invention. With respect to the former catalyst systems, it is shown that the addition of an alkoxide of titanium does not have any effect on the branching state and therefore on the specific gravity of the polyethylenes obtained. In effect, if the actual specific gravity of these products is lower in Examples R$_3$ and R$_4$ than in Example R$_1$, it is simply because the molecular weight of the products obtained is higher.

On the other hand, it is shown that the addition of titanium alkoxides has guite a detrimental effect on the activity of catalyst systems in which the transition metal compound, such as titanium tetrachloride, is not reacted onto Mg(OH)Cl, which is not the case for the catalyst systems of the invention.

TABLE III

| No. of the Example | 15 | 16 | 17 | 18 | R$_1$ | R$_2$ | R$_3$ | R$_4$ |
|---|---|---|---|---|---|---|---|---|
| Product of reaction of Mg(OH)Cl with TiCl$_4$: | | | | | | | | |
| Ti content, g./kg | 5.8 | 5.8 | 3.4 | 5.8 | 5.8 | | | |
| Quantity employed, mg | 220 | 220 | 366 | 220 | 213 | | | |
| Titanium tetrachloride; Quantity, mg | | | | | | 100 | 100 | 100 |
| Titanium isopropylate; Quantity, mg | 20 | 10 | 3 | 2 | | | 22.5 | 225 |
| Triethylaluminum; Quantity, mg | 500 | 500 | 500 | 500 | 500 | 209 | 209 | 455 |
| Molar ratio of Ti(OR)$_4$ to Ti reacted on Mg(OH)Cl or to TiCl$_4$ | 2.6 | 1.3 | 0.4 | 0.26 | 1 | 0 | 0.15 | 1.5 |
| Partial pressure of the hydrogen, kg./cm.$^2$ | 1 | 1.9 | 5 | 1.2 | 2 | 5 | 5 | 5 |
| Weight of the polyethylene obtained, g | 216 | 212 | 229 | 232 | 210 | 7 99 | 8 39 | 8 7 |
| Specific activity of the catalyst [4] | 10,700 | 10,500 | 9,250 | 11,500 | 10,400 | 785 | 78 | 14 |
| Intrinsic viscosity, l./g | 0.31 | 0.20 | 0.20 | 0.29 | 0.24 | | | |
| Melt index, g./10 min | 0.04 | 0.27 | 0.25 | 0.06 | 0.5 | 0.23 | 0.026 | 9 0.001 |
| Melt Viscosity at 190° C. under 100 sec.$^{-1}$, poises | 30,000 | 20,100 | 18,500 | 24,900 | 21,000 | | | |
| Actual specific weight, kg./cm.$^3$ | 0.945 | 0.941 | 0.956 | 0.959 | 0.963 | 0.960 | 0.958 | 0.951 |
| Melting point, ° C | 120 | 120 | | 130 | | 132 | 133 | 133 |
| Modulus of rigidity in torsion at 23° C., kg./cm.$^2$ | 2,000 | 1,600 | 3,300 | 4,000 | 4,400 | | | |
| Modulus of elasticity at 23° C., kg./cm.$^2$ | 5,200 | 4,400 | | 8,500 | | | | |
| Resistance to impact under tension, kg./cm.$^2$ | 250 | 170 | | 210 | | | | |
| Tensile strength (yield-stress): | | | | | | | | |
| Of compression molded test bars, kg./cm.$^2$ | 240 | 230 | 290 | 310 | 315 | | | |
| Of injection molded test bars, kg./cm.$^2$ | 255 | 240 | | 325 | | | | |
| Elongation at rupture, percent | 70 | 40 | | 50 | | | | |
| Resistance to cracking under tension, >h [5] | >1,000 | 900 | 170 | 230 | 60 | | | |
| Number of —CH$_3$ groups per 1,000 atoms of C | 5 | 3 | <1 | <1 | 0 | 0 | 0 | 0 |

[1] The Melt Index has been determined according to the ASTM D 1238-57 T Standard.
[2] The product of the reaction of Mg(OH)Cl with TiCl$_4$ employed in this example contained 5.6 g. of titanium per kg.
[3] The test was held over a period of 3 hours instead of 2.
[4] The specific activity is expressed in g. of polymer per hour per g. of titanium fixed on the base and per unit of pressure of the ethylene figured in kg./cm.$^2$.
[5] The resistance to cracking has been determined according to the method described by L. Lander (SPE Journal, 1960, 16, page 1,329), at 50° C., under a tension of 60 kg./cm.$^2$, in the presence of a solution containing 10% Antarox CO 630.
[6] The duration of the test is 1 hour instead of 2:
[7] Duration of the test 30 minutes
[8] Duration of the test 120 minutes.
[9] Estimated from a viscosiometric measurement of molecular weight.

EXAMPLE 19

Approximately 150 g. of polyethylene in powder form is introduced into a 1.5 1. autoclave as a diluent.

A hot current of nitrogen is blown into the autoclave to eliminate oxygen and any moisture and then 0.5 cm.$^3$ of TiO(i-C$_3$H$_7$)$_4$ is introduced into the autoclave and the autoclave contents are stirred in order to distribute the titanium alkoxide through the polyethylene powder.

Hydrogen is introduced into the autoclave until the pressure in the autoclave reaches 5 kg./cm.$^2$ and then ethylene is introduced until a total pressure of 20 kg./cm.$^2$ is reached.

2.5 cm.$^3$ of Al(i-C$_4$H$_9$)$_3$ is injected into the autoclave and, shortly thereafter, 0.5 g. of a reaction product of Mg(OH)Cl with TiCl$_4$. This product has been prepared in hexane and contains 6 g. of titanium per kg. Ethylene is again introduced into the autoclave, at the rate of approximately 400 g./hr.

After 1 hour of polymerization, the total pressure in the autoclave reaches about 30 kg./cm.$^2$ and the polymerization is terminated by cooling the autoclave and removing any gaseous ethylene remaining.

A yield of 120 g. of polyethylene is separated from the diluent by sifting. The specific weight of this polymer is close to 0.925 kg./cm.$^3$ and its melt box is 0.3.

While the invention has been described by reference to particular embodiments thereof, it is intended that these embodiments be illustrative and not restrictive.

What I claim and desire to secure by Letters Patent is:

1. In a process for the polymerization of ethylene in the presence of a catalyst obtained by activating with an alkylaluminum the reaction product of a compound selected from the group consisting of halides, haloalkoxides and alkoxides of transition metal selected from the group consisting of the elements of Groups IV–B, V–B, VI–B with a solid catalyst support comprising an hydroxychloride of magnesium, the improvement comprising adding to the said catalyst an alkoxide of a metal of Group IV–B of the Periodic Table in such an amount that the molar ratio of said alkoxide to the transition metal compound present in said reaction product is comprised between 0.05 and 50 to thereby obtain a less linear polymer.

2. Method according to claim 1, in which the molar ratio of the alkoxide to the transition metal compound reacted with the support is between 0.2 and 20.

3. Method according to claim 1, in which the metal of the alkoxide is titanium.

4. Method according to claim 1 in which said compound of a transition metal is a transition metal halide.

5. Method according to claim 1 in which said compound of a transition metal is titanium tetrachloride.

6. Method according to claim 1 in which said alkylaluminum is a trialkylaluminum.

7. Method according to claim 1 in which said compound of a transition metal is titanium tetrachloride, said alkoxide of a metal of Group IV–B of the Periodic Table is titanium alkoxide, and said alkylaluminum is a trialkylaluminum.

8. Catalyst system for the polymerization of olefins comprising trialkylaluminum, an alkoxide of a metal of Group IV–B of the Periodic Table and the product of the reaction between a compound selected from the group consisting of a halide, a haloalkoxide and an alkoxide of a transition metal selected from the group consisting of elements of Groups IV–B, V–B and VI–B of the Periodic Table and a solid support therefor consisting of a hydroxychloride of magnesium, the molar ratio of said alkoxide to the transition metal compound present in the reaction product being comprised between 0.05 and 50.

9. Catalyst system according to claim 8, in which the molar ratio of the alkoxide to the transition metal compound reacted with the support is between 0.2 and 20.

10. Catalyst system according to claim 8, in which the metal of the alkoxide is titanium.

11. Catalyst system according to claim 8 in which said compound of a transition metal is a transition metal halide.

12. Catalyst system according to claim 8 in which said compound of a transition metal is titanium tetrachloride.

13. Catalyst system according to claim 8 in which said compound of a transition metal is titanium tetrachloride and said alkoxide of a metal of Group IV–B is titanium alkoxide.

References Cited

UNITED STATES PATENTS

| | | | |
|---|---|---|---|
| 3,400,110 | 9/1968 | Dassesse | 260—93.7 |
| 3,329,741 | 7/1967 | Schrage | 260—93.7 |
| 3,328,381 | 6/1967 | Borman | 260—94.9 |
| 3,214,417 | 10/1965 | Bloyaert | 260—88.2 |
| 3,061,602 | 10/1962 | Duck et al. | 260—94.9 |

JOSEPH L. SCHOFER, Primary Examiner

E. J. SMITH, Assistant Examiner

U.S. Cl. X.R.

252—429